Patented July 20, 1943

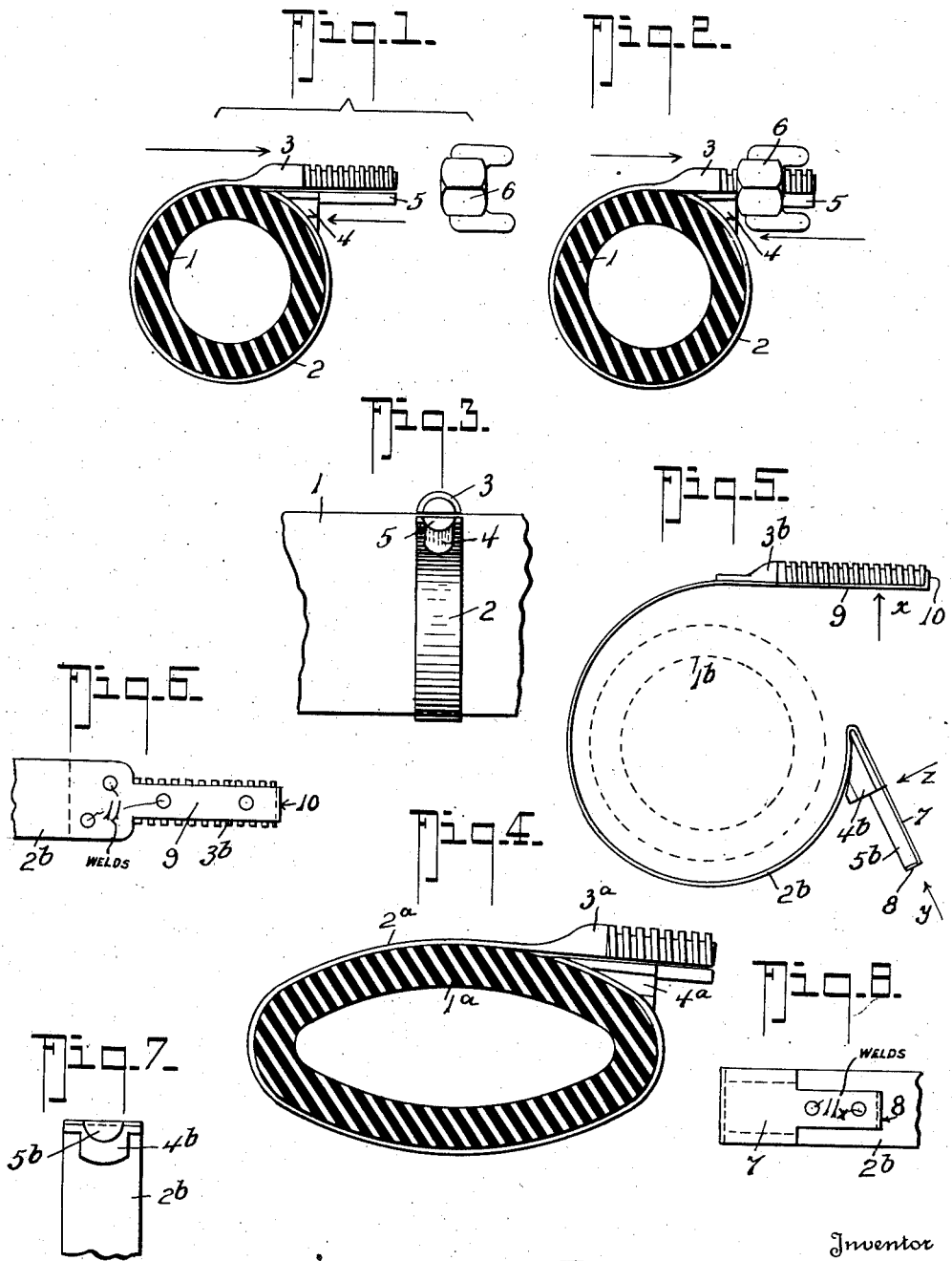

2,324,780

UNITED STATES PATENT OFFICE 2,324,780

HOSE CLAMP

James T. King, Burbank, Calif.

Application February 24, 1942, Serial No. 432,132

6 Claims. (Cl. 24—19)

My invention relates to the art of hose clamps and it particularly has for its object to provide a clamp which complies in all respects to the requirements of existing Army and Navy standards for hose clamps.

More specifically, the invention has for its objects: to provide a clamp which is especially adapted for use with all forms of bullet-proof hose connections; a clamp throughout a full circle (360°) with the entire area of the clamping band used as a tensioning medium; a clamp of light weight and relatively great strength; a clamp which is corrosion proof and fire proof; a clamp which can be quickly installed and disconnected, one so constructed that it may be opened up for installation on any connected fuel or oil line, and one that can be easily put in places where it is awkward to place and tension clamps without the use of special tools, and one that can be installed by the average mechanic, using only one hand. Further objects of the invention are to provide a hose clamp embodying the following characteristics:

A one-piece construction that can be made by means of a coin press operation formed from metal strip section or swedged from round or half round metal; no reverse torque stresses are required to release tension for the hose clamp's removal; by virtue of its one-piece construction, combined with great strength, it is especially suited for high pressure hydraulic hose connections for which no existing hose clamp is satisfactory; it is adapted for use on all forms and sizes of hose connections, including hose of other shapes than circular, as for example, streamline shapes or elliptical shapes.

Other objects will in part be obvious and in part being pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which—

Fig. 1 is a side elevation of a clamp ready to receive the tensioning nut, the hose being shown in section.

Fig. 2 is a view similar to Fig. 1 with the nut in place, the arrows indicating the directions of the operation of the nut.

Fig. 3 is a view taken in the direction of the lower arrow in Fig. 1, the nut being omitted.

Fig. 4 is a view similar to Fig. 1, showing the clamp fitted to an elliptical hose, the nut being omitted.

Fig. 5 is a side elevation of a slightly modified combination of a clamp, showing the same in a partly open position.

Fig. 6 is a detail view looking in the direction of the arrow $x$ in Fig. 5.

Fig. 7 is a detail view, looking in the direction of the arrow $y$ in Fig. 5.

Fig. 8 is a detail view, looking in the direction of the arrow $z$ in Fig. 5.

In the drawing, in which like numbers of reference indicate like parts in all the figures, 1 is the hose, 2 a flexible band one end of which has a threaded rod-like portion 3 of semi-circular cross-section while the other end is provided with an abutment 4 and a semi-circular cross-section rod-like portion 5 which parallels the portion 3 when in use.

A wing nut 6 is provided to fit on the portions 3 and 5, but which has threaded engagement with the portion 3 only, and which engages the abutment 4 so that, with the band 2 encircling the hose 1 and the nut tightened, the portions 3 and 5 are moved in opposite directions (see arrows, Figs. 1 and 2) and tension is applied to the band 2 to cause it to compress the hose 1 radially inwardly throughout a full circle of 360°.

In the preferred constructions of my invention illustrated in the drawing, the parting line between the elements 3 and 5 lies tangent to the circumference of the hose, regardless of whether the hose be circular or elliptical in cross section.

In Fig. 4 those parts which correspond to like parts in the preceding figures bear the same reference number plus the index letter $a$, so a detailed description of Fig. 4 is believed to be unnecessary in this specification.

In Figs. 5 to 8, inclusive, I have shown a slightly modified way of constructing the clamp. In this modification one rod-like portion of the band $2^b$ is constituted by a separate member $3^b$ and an extension 9 of the band, the extreme end of which is bent up at right angles, as at 10, to comprise an abutment for the outer end of the member $3^b$; the extension 9 being spot welded as at $11^x$ (Fig. 6) to the member $3^b$.

Also, the other rod-like member $5^b$ and the abutment $4^b$ are made separately from the band, the band having an extension 7 overlying the flat face of the member $5^b$ and secured to it by spot welds $11^x$ (Fig. 8), the extreme end of the extension 7 being bent over at right angles as at 8 to constitute an abutment for the outer end of the member 5ᵇ.

Thus the parts shown in Fig. 5 constitute a single integral structure.

The right angled end 10 of the strap or band portion 9 serves to relieve, in part, the strain on the member 3ᵇ when the clamp is under tension, while both abutments 8 and 10 assist in locating the members 5ᵇ and 3ᵇ respectively on the strap extensions 7 and 9 respectively during the welding operations.

From the foregoing description, taken in connection with the accompanying drawing, it is thought that the construction, operation and advantages of the invention will be clear to those skilled in the art to which it relates.

What I claim is:

1. A hose clamp comprising a flexible band one end of which is provided with a threaded rod-like portion, the other end of which is provided with an abutment and a non-threaded rod-like portion, said rod-like portions being constructed to lie in parallelism and approximately tangent to the band when the clamp is in use, and a nut to fit over said rod-like portions and engage said abutment while the rod-like portions lie in parallelism and having threaded engagement with the first mentioned rod-like portion only, each of said rod-like portions being of semi-circular form in cross-section and having opposed and adjacent flat faces which, when the clamp is in use, lie in close proximity.

2. A hose clamp comprising a flexible band one end of which is provided with a threaded rod-like portion, the other end of which is provided with an abutment and a non-threaded rod-like portion, said rod-like portions being constructed to lie in parallelism when the clamp is in use, and a nut to fit over said rod-like portions and engage said abutment while the rod-like portions lie in parallelism and having threaded engagement with the first mentioned rod-like portion only, each of said rod-like portions being of semi-circular form in cross-section and having opposed flat faces which, when the clamp is in use, lie in close proximity, the plane which lies between said rod-like portions being substantially tangent to the circumference of the hose on which the clamp is used.

3. A hose clamp comprising a flexible band one end of which has a rod-like portion of semi-circular cross-section extending forwardly of the band, the other end of which has a rod-like portion of semi-circular cross-section which extends backwardly at an acute angle to the band, the construction being such that when the band encircles a hose the flat faces of the rod-like portions will lie parallel and in proximity to one another and approximately tangent to the band, and means for holding said rod-like portions in their proximate relation and applying band tensioning forces to the rod-like portions respectively in opposite directions.

4. A hose clamp comprising a flexible band one end of which has a rod-like portion of semi-circular cross-section extending forwardly of the band, the other end of which has a rod-like portion of semi-circular cross section which extends backwardly at an acute angle to the band, the construction being such that when the band encircles a hose the flat faces of the rod-like portions will lie parallel and in proximity to one another and approximately tangent to the band, and means for holding said rod-like portions in their proximate relation and applying band tensioning forces to the rod-like portions respectively in opposite directions, said last named means comprising threads on one rod-like portion, an abutment on the other rod-like portion, and a nut fitted on said rod-like portions and having threaded engagement with said threaded rod-like portion and sliding engagement with the other rod-like portion and pressure engagement with said abutment.

5. A hose clamp comprising a flat flexible band, a threaded rod-like member of semi-circular cross section having a flat under face, one end of said band having a portion underlying said flat under face and secured permanently thereto, a non-threaded rod-like member having an abutment and having a flat upper face, the other end of said band having a portion overlying said flat upper face and secured permanently thereto, said other end of said band and its non-threaded rod-like member extending backwards at an acute angle to the band proper, and a nut to receive said rod-like members with their opposed faces located together in a plane substantially tangent to the curvature of the band when applied to a hose.

6. A hose clamp comprising a flat flexible band to encircle a hose and including two end extensions, one of said extensions having an upturned end constituting an abutment, a threaded rod-like member of semi-circular cross section having its longitudinal flat face lying on said one of said end extensions and its outer end lying against the abutment of the same end extension, means permanently uniting said threaded rod-like member to its end extension, the other end extension being bent backwardly to lie at an acute angle to the band proper, a non-threaded rod-like member of a cross section such as to provide a flat longitudinal face to overlie said other extension in contact with the same and having an abutment, a nut to fit on said threaded rod-like member, said non-threaded rod-like member having a portion in advance of the abutment of a size to fit within said nut when the nut is on said threaded rod-like member, said nut serving to hold said rod-like members together and to engage said abutment, said rod-like members, when the clamp is in use, lying approximately tangent to the band, by virtue of all of which when the nut is tightened tension will be applied to said band throughout approximately 360° of clamping surface.

JAMES T. KING.